United States Patent
Sato et al.

(10) Patent No.: US 7,742,280 B2
(45) Date of Patent: Jun. 22, 2010

(54) COIN-SHAPED STORAGE CELL

(75) Inventors: Masayuki Sato, Osaka (JP); Masashige Ashizaki, Osaka (JP); Koichi Morikawa, Kyoto (JP); Isamu Nishiyama, Osaka (JP); Nario Niibo, Osaka (JP); Masayuki Taniguchi, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/401,149

(22) Filed: Mar. 10, 2009

(65) Prior Publication Data

US 2009/0176154 A1 Jul. 9, 2009

Related U.S. Application Data

(62) Division of application No. 10/581,339, filed as application No. PCT/JP2004/017960 on Dec. 2, 2004, now Pat. No. 7,576,969.

(30) Foreign Application Priority Data

| Dec. 3, 2003 | (JP) | ............................. 2003-404161 |
| Jan. 15, 2004 | (JP) | ............................. 2004-007686 |
| May 18, 2004 | (JP) | ............................. 2004-147429 |

(51) Int. Cl.
*H01G 9/00* (2006.01)

(52) U.S. Cl. .................. 361/502; 361/503; 361/504; 361/508; 361/512; 361/523

(58) Field of Classification Search ................. 361/502, 361/503–504, 508–512, 516–519, 303–305, 361/523–528, 529

See application file for complete search history.

(56) References Cited

U.S. PATENT DOCUMENTS

| 3,723,184 | A |   | 3/1973 | Stark et al. |
| 4,791,034 | A |   | 12/1988 | Dopp |
| 5,725,967 | A |   | 3/1998 | Tuttle |
| 5,953,204 | A |   | 9/1999 | Suhara et al. |
| 6,031,712 | A | * | 2/2000 | Kurihara et al. ............. 361/502 |
| 6,064,561 | A | * | 5/2000 | Harada et al. ............... 361/502 |

(Continued)

FOREIGN PATENT DOCUMENTS

GB  2 101 393  1/1983

(Continued)

OTHER PUBLICATIONS

International Search Report issued Mar. 15, 2005 in the International (PCT) Application No. PCT/JP2004/017960.

(Continued)

*Primary Examiner*—Nguyen T Ha
(74) *Attorney, Agent, or Firm*—Wenderoth, Lind & Ponack, L.L.P.

(57) ABSTRACT

A coin-shaped storage cell (1) has a pair of polarizable electrodes (17, 18), an insulating separator (21) interposed between the polarizable electrodes, an electrolytic solution (22) impregnated in the polarizable electrodes (17, 18) and the separator (21), a metal case (11) for housing the polarizable electrodes (17, 18), an insulating ring packing (15) arranged in the metal case, and a top lid (13) which is caulked integrally with the metal case (11) via the ring packing (15). The inner bottom surface of the metal case (11) is provided with recessed and projected portions.

7 Claims, 10 Drawing Sheets

U.S. PATENT DOCUMENTS

| | | | |
|---|---|---|---|
| 6,327,136 B1 * | 12/2001 | Meguro et al. | 361/502 |
| 6,327,137 B1 * | 12/2001 | Yamamoto et al. | 361/517 |
| 6,574,092 B2 * | 6/2003 | Sato et al. | 361/502 |
| 6,842,330 B2 * | 1/2005 | Farahmandi et al. | 361/502 |
| 2002/0031704 A1 | 3/2002 | Okahisa et al. | |

FOREIGN PATENT DOCUMENTS

| | | |
|---|---|---|
| JP | 57-202060 | 12/1982 |
| JP | 58-121549 | 7/1983 |
| JP | 4-26050 | 1/1992 |
| JP | 10-303072 | 11/1998 |
| JP | 2000-48780 | 2/2000 |
| JP | 2000-286167 | 10/2000 |
| JP | 2001-210553 | 8/2001 |
| JP | 2002-25869 | 1/2002 |
| JP | 2003-22935 | 1/2003 |

OTHER PUBLICATIONS

Supplementary European Search Report issued Feb. 12, 2010 in Application No. EP 04 81 9908.

* cited by examiner

PRIOR ART    FIG. 9

COIN-SHAPED STORAGE CELL

This application is a divisional of application Ser. No. 10/581,339, filed Jun. 2, 2006 now U.S. Pat. No. 7,576,969 which is the National Stage of International Application No. PCT/JP2004/017960, filed Dec. 2, 2004.

TECHNICAL FIELD

The present invention relates to a coin-shaped capacitor, cell, or the like for use in a variety of electronic devices.

BACKGROUND ART

There are known coin-shaped storage cells such as electric double layer capacitors and button cells. FIG. 9 is a cross-sectional view showing a construction of a conventional coin-shaped electric double layer capacitor. Referring to FIG. 9, the capacitor is constructed in such a manner that a polarizable electrode 88 at a cathode (positive) side, which is an activated carbon electrode, and a polarizable electrode 87 at an anode (negative) side, which is an activated carbon electrode, are opposed to each other via an insulating separator 91, thereby forming an electrode pair. A positive electrode collector 90 and a negative electrode collector 89 are provided on the cathode-side polarizable electrode 88 and the anode-side polarizable electrode 87, respectively.

The capacitor in FIG. 9 is produced by impregnating an electrolytic solution 92 in the polarizable electrode pair 87, 88, and the separator 91, and by housing the electrode pair 87, 88, and the separator 91 in a housing space defined by an upper case 83 serving as an anode terminal and a lower case 81 serving as a cathode terminal. In the production, an electric insulating packing 85 is disposed in a space defined by a bent portion 84 formed at an outer periphery of the upper case 83, and an outer periphery of the lower case 81. Then, the bent portion 84 of the upper case 83 is encased by the packing 85 by curling a tip end 82 of the outer periphery of the lower case 81 inwardly, whereby the housing space for housing the polarizable electrode pair 87, 88 is brought into an airtight sealed state.

In the case of a button cell, a cathode electrode and an anode electrode are housed in a metal case constituted of two case portions by way of a separator. The external construction of the button cell is substantially the same as that of the electric double layer capacitor.

The coin-shaped storage cells are widely used as a main power source and a memory backup source for compact portable devices such as cellular phones. As miniaturization of electronic devices progresses, a demand for the coin-shaped storage cells is yearly increased. In light of the social trend on the electronic devices, it is indispensable to secure long-term high reliability for the coin-shaped storage cells, which is an important element of the electronic devices.

Also, in recent years, as the miniaturization of electronic devices progresses, high integration of electronic parts including the coin-shaped storage cells progresses. A surface mounting by reflow soldering has become a mainstream as a soldering process appropriate for the high integration. The reflow soldering comprises allowing a storage cell mounted on a solder-coated printed board to pass through a furnace of a high-temperature atmosphere of 200° C. or more to solder the storage cell to the printed board. Also, in recent years, as lead-free soldering has been introduced considering environmental issues, reflow soldering with use of tin having a melting point higher than the melting point of lead by about 20° C. has been carried out. In view of this, a higher heat resistance, and a longer lifetime after reflow processing are required for the electronic parts to be mounted on the printed board.

As an approach for securing high reliability of the storage cells, for instance, Japanese Unexamined Patent Publication No. 2003-22935 discloses a technique that the polarizable electrode pair 87, 88 is fixed at a predetermined position by forming a guide portion on the inner bottom surface of the lower case 81 near the polarizable electrode pair, whereby displacement of the electrode pair is prevented.

In addition to the above demand, improvement on liquid-leakage resistance of the coin-shaped storage cells is demanded in order to maintain the quality of the storage cells. Leakage of the electrolytic solution out of the storage cells may cause not only degradation of characteristics of the storage cells but also disorder of peripheral circuits and electronic devices.

In order to improve liquid-leakage resistance of the storage cells, for instance, Japanese Unexamined Patent Publication No. 2000-48780 discloses a technique that the bent portion on the outer periphery of the upper case 83 is made flat, and the width of the flat portion is set in the range of 75 to 150% relative to the thickness of the upper case 83 so as to improve liquid-leakage resistance.

The conventional electric double layer capacitors disclosed in the above publications have a drawback that the vapor pressure of a solvent in an organic electrolytic solution is raised due to a high-temperature condition at the time of lead-free reflow soldering at a soldering temperature of 250° C. or more, which remarkably raises the pressure of the housing space defined by the upper case 81 and the lower case 83, and eventually causes a clearance between the inner bottom surface of the lower case 81 and the bottom surface of the packing 85, thereby causing leakage of the electrolytic solution.

DISCLOSURE OF THE INVENTION

In view of the above, an object of the present invention is to solve the problems residing in the prior art, and to provide a coin-shaped storage cell that has a high heat resistance, enables to prevent leakage of a liquid such as an electrolytic solution, and exhibits long-term stable characteristics.

To accomplish the above object, a coin-shaped storage cell according to an aspect of the invention comprises: a pair of polarizable electrodes; an insulating separator which is interposed between the polarizable electrodes; an electrolytic solution which is impregnated in the polarizable electrode pair and the separator; a metal case for housing the polarizable electrode pair; an insulating ring packing which is disposed inside the metal case; and a top lid which is integrally caulked with the metal case via the ring packing, wherein the metal case includes an inner bottom surface formed with asperities.

According to the aspect, the asperities are formed on the inner bottom surface of the metal case, and the ring packing is firmly contacted with the inner bottom surface of the metal case where the asperities are formed, with the ring packing being pressed by the top lid. The top lid, the ring packing, and the metal case are integrally caulked in this state. With this arrangement, the ring packing is deformed in accordance with the asperities, and the firm contact of the metal case with the ring packing is enhanced, as the ring packing is deformed in accordance with the asperities, and airtightness is improved. Thus, the coin-shaped storage cell according to the aspect of the invention has a high heat resistance, enables to prevent leakage of a liquid such as the electrolytic solution, and exhibits long-term stable characteristics.

A coin-shaped storage cell according to another aspect of the invention comprises: a pair of polarizable electrodes; an insulating separator which is interposed between the polarizable electrodes; an electrolytic solution which is impregnated in the polarizable electrode pair and the separator; a metal case for housing the polarizable electrode pair; an insulating ring packing which is disposed inside the metal case; and a top lid which is integrally caulked with the metal case via the ring packing, wherein the ring packing includes a bottom surface formed with a first annular bulging portion, the first annular bulging portion protruding toward the metal case.

According to the another aspect, the first annular bulging portion is formed on the bottom surface of the ring packing, and the bottom surface of the ring packing where the first annular bulging portion is formed is firmly contacted with the inner bottom surface of the metal case, with the ring packing being pressed by the top lid. The top lid, the ring packing, and the metal case are integrally caulked in this state. In the caulking, since the first annular bulging portion formed on the ring packing is deformed, the firm contact of the metal case with the ring packing is enhanced, and airtightness is improved. Thus, the coin-shaped storage cell according to the another aspect of the invention has a high heat resistance, enables to prevent leakage of a liquid such as the electrolytic solution, and exhibits long-term stable characteristics.

These and other objects, features and advantages of the present invention will become more apparent upon reading of the following detailed description along with the accompanying drawings.

BEST MODE FOR CARRYING OUT THE INVENTION

Figure 1:
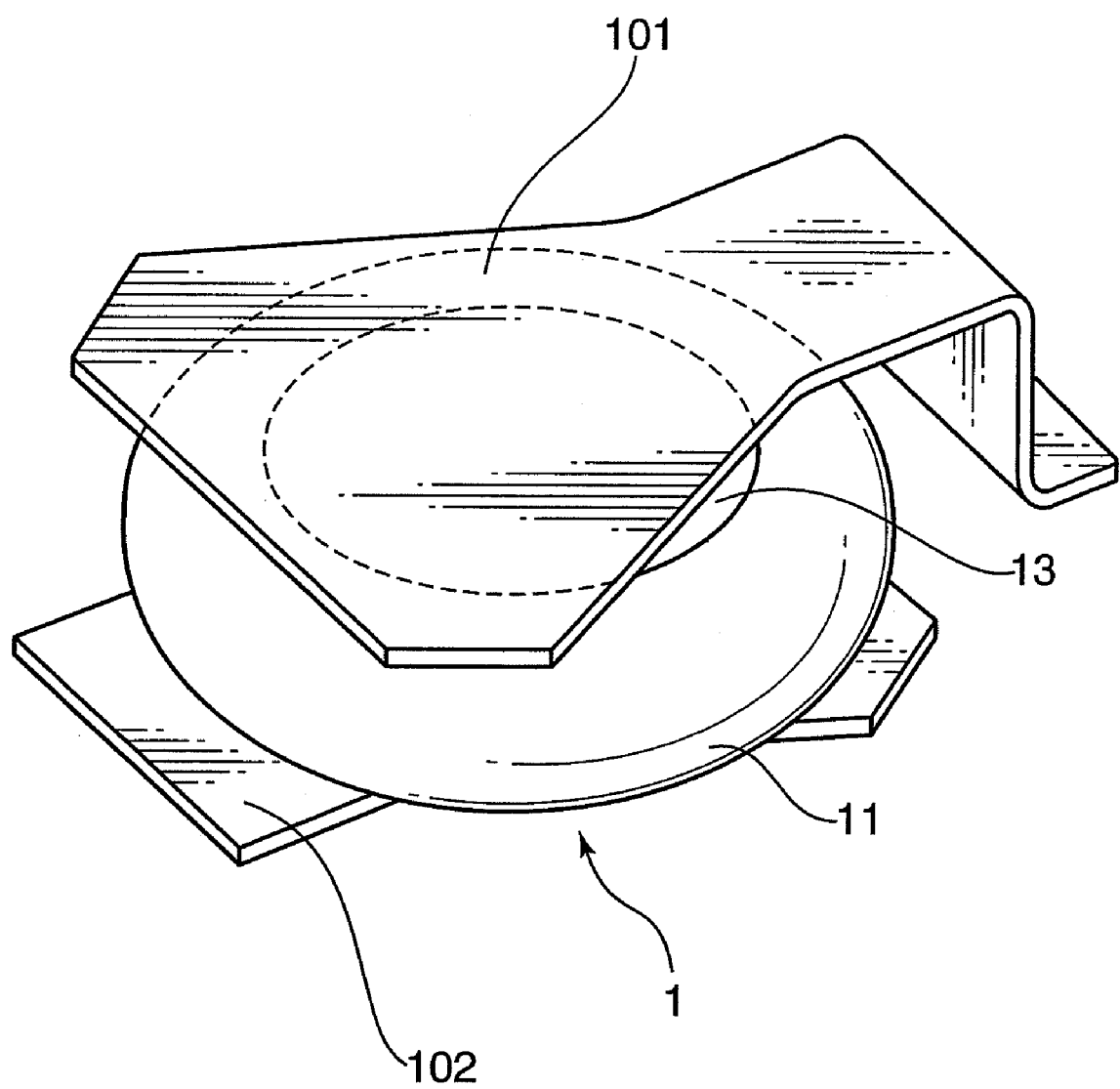
FIG. 1 is a perspective view of a coin-shaped electric double layer capacitor embodying the invention, which is connected to external terminals.

In the following, embodiments of the invention are described in details referring to the drawings. Elements having like reference numerals throughout the drawings have identical or equivalent arrangements to each other, and detailed repeated description on the like elements is avoided herein.

FIG. 1 is a perspective view of a coin-shaped electric double layer capacitor, as an example of a coin-shaped storage cell embodying the invention, specifically showing a state that the coin-shaped electric double layer capacitor is connected to external terminals. The coin-shaped electric double layer capacitor 1 externally comprises a top lid 13 serving as an anode (negative electrode), and a metal case 11 serving as a cathode (positive electrode). Firmly contacting the top lid 13 and the metal case 11 prevents leakage of a liquid such as an electrolytic solution out of the capacitor 1. An anode-side external terminal 101 is connected to the outer surface of the top lid 13, and a cathode-side external terminal 102 is connected to the outer surface of the metal case 11, respectively. The external terminal 101, 102 is connected to an unillustrated electric circuit or an equivalent element so that an intended voltage is supplied to the capacitor 1.

As shown in FIG. 1, the external terminal 101, 102 may preferably have a substantially triangular shape for the following reason. Providing the external terminals 101 and 102 each in the form of a substantially triangular shape enables to weld the top lid 13 and the metal case 11 to the external terminals 101 and 102, respectively, while securing large connecting areas with the top lid 13 and the metal case 11. This arrangement enables to maintain the distance between the external terminals 101 and 102 with high precision without deforming the external terminals 101 and 102, thereby securing high reliability in welding. As a result, the external terminals 101 and 102 are connected to the top lid 13 and the metal case 11, respectively with high precision in a small coin-shaped storage cell with a diameter thereof e.g. from 3 to 5 mm. In other words, mounting the external terminals 101 and 102 each in the form of a substantially rectangular shape on the top lid 13 and the metal case 11, respectively, enables to stably fix the capacitor 1, while reducing contact resistances with the external terminals 101 and 102 due to the wide connecting areas.

In the following, an arrangement of the capacitor 1 as an example of the inventive coin-shaped storage cell will be described in details. In the specification, the term "upper side" corresponds to an upward direction on the plane of FIG. 1, for instance. So is the same for the term "lower side". Specifically, the top lid 13 is located on the upper side, viewed from the bottom surface of the metal case 11 in FIG. 1, i.e. the lowermost surface of the metal case 11 in FIG. 1, and the bottom surface of the metal case 11 is located on the lower side, viewed from the top lid 13.

First Embodiment

Figure 2:
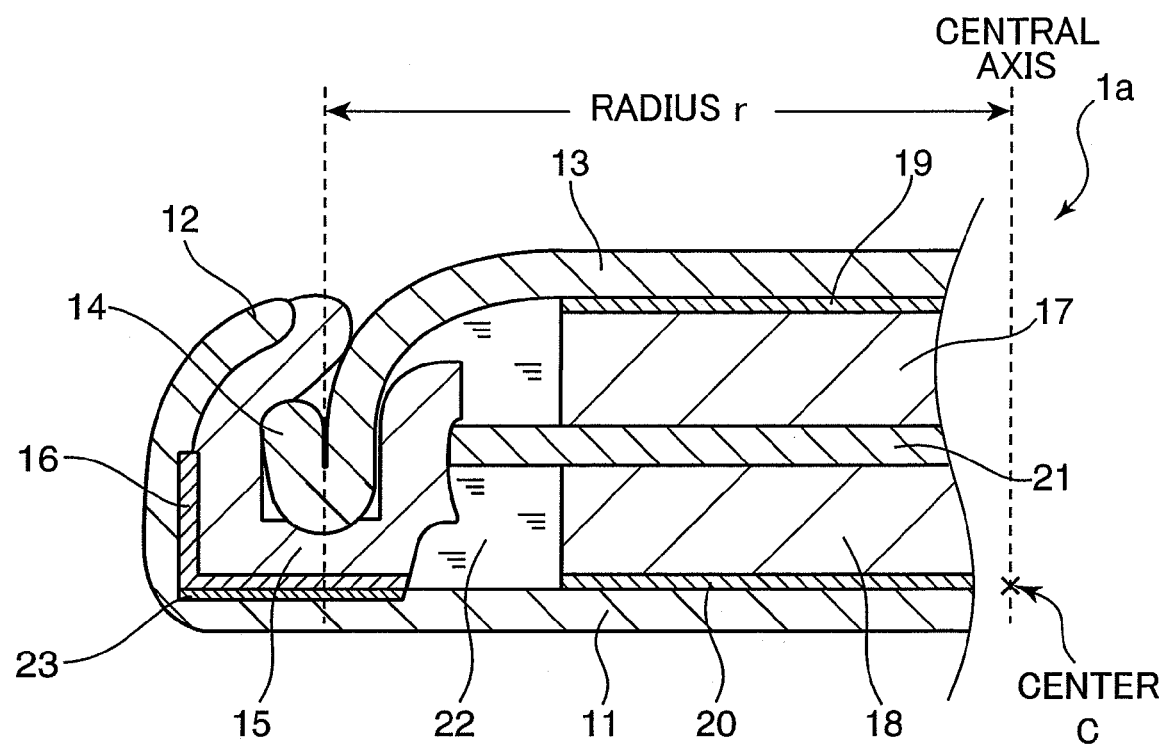
FIG. 2 is a partially cross-sectional view showing a construction of a coin-shaped electric double layer capacitor as a first embodiment of the invention.

FIG. 2 is a partially cross-sectional view showing an arrangement of a coin-shaped electric double layer capacitor according to a first embodiment of the invention. The capacitor 1a includes a metal case 11, a top lid 13, a bent portion 14 of the top lid 13, a ring packing 15, a sealing auxiliary member 16, polarizable electrodes 17, 18, electrode collectors 19, 20, a separator 21, and an electrolytic solution 22.

The metal case 11 corresponds to a lower case of the capacitor 1a, and serves as a cathode. The top lid 13 corresponds to an upper case of the capacitor 1a, and serves as an anode. Preferably, the metal case 11 and the top lid 13 may be made of a material having a high electric conductivity and a high corrosion resistance. Examples of the material for the metal case 11 and the top lid 13 are various stainless steels (SUS) and aluminum. Hereinafter, in the specification, the term "inner bottom surface" of the metal case 11 means an upper surface of the metal case 11 in FIG. 2, in other words, a bottom surface on the inner side of the metal case 11 where the polarizable electrode pair 17, 18 or the like is accommodated. Similarly, the term "inner bottom surface" of the top lid 13 means a lower surface of the top lid 13 in FIG. 2, in other words, a surface on the inner side of the top lid 13 where the polarizable electrode pair 17, 18 or the like is accommodated.

The ring packing 15 may preferably be made of a material having functions capable of securing electrical insulation between the metal case 11 as the cathode, and the top lid 13 as the anode, preventing leakage of a liquid such as the electrolytic solution 22 out of the capacitor 1a, and preventing intrusion of water components or the like into the capacitor 1 (sic). Examples of the material having the aforementioned functions and superior in moldability and processability are resins or plastics such as polyethylene, polypropylene, polyamide, polyphenylene sulfide, polybutylene, polyimide, liquid crystal polymer, polyetheretherketone, and polyamideimide. In the specification, the term "bottom surface" of the ring packing 15 means a lower surface of the ring packing 15 in FIG. 2, in other words, a surface facing the inner bottom surface of the metal case 11.

The sealing auxiliary member 16 is disposed, according to needs, on a contact site where the metal case 11 and the ring packing 15 are contacted with each other to enhance sealing of the capacitor 1a. In view of this, the sealing auxiliary member 16 may preferably be made of a material compatible with a metal. Examples of the material for the sealing auxiliary member 16 are asphalt pitch, styrene-butadiene rubber, and butyl rubber. The polarizable electrode pair 17, 18 may be made of a material obtained by admixing activated carbon powders with a binder, a fabric of activated carbon fiber, or a like material.

The electrode collectors 19 and 20 have functions of electrically connecting the polarizable electrodes 17 and 18 to the top lid 13 and to the metal case 11, respectively, in order to continue supply of a current to the polarizable electrodes 17 and 18, as positive and negative electrodes. In view of this, the electrode collector 19, 20 may preferably be made of a material having a high electric conductivity and a chemically stable property. Examples of the material for the electrode collector 19, 20 are graphite and carbon black.

The separator 21 is a sheet member that enables to prevent direct contact of the polarizable electrodes 17 and 18, and may preferably be made of a porous insulating material allowing free passage of the electrolytic solution 22. Examples of the material for the separator 21 are olefin resins such as polypropylene, celluloses, and aramid resins.

As a solvent of the electrolytic solution 22, used is a mixture of one or more kinds selected from propylene carbonate, γ-butyrolactone, ethylene carbonate, sulfolane, acetonitrile, dimethyl carbonate, diethyl carbonate, or methylethyl carbonate, 1,2-dimethoxymethane, 1,3-dimethoxypropane, dimethylether, tetrahydrofurane, 2-methyltetrahydrofurane, and the like.

Examples of an electrolytic cation (positive ion) are quaternary ammonium ions, quaternary phosphonium ions, and compound salts including an amidine group. Examples of an electrolytic anion (negative ion) are $BF_4^-$, $PF_6^-$, $ClO_4^-$, $CF_3SO_3^-$, or $N(CF_3SO_2)_2^-$. Specifically, solutions in which lithium hexafluorophosphate ($LiPF_6$), lithium hexafluoroarsenate ($LiAsF_6$), lithium perchlorate ($LiClO_4$), lithium borofluoride ($LiBF_4$), lithium trifluoromethane sulfonate ($LiCF_3SO_3$) or a like compound is dissolved in the above solvent can be used as examples of the electrolyte.

Among the above, the solvent such as propylene carbonate or sulfolane is preferred. With use of propylene carbonate or sulfolane, a high voltage-resistive electric double layer capacitor can be produced. Also, with use of quaternary salt compounds having imidazolium as an electrolyte, generation of hydroxide ions which degrade sealing performance of a sealing member can be suppressed.

In the coin-shaped electric double layer capacitor 1a provided with the above elements, the cathode-side polarizable electrode 18 and the anode-side polarizable electrode 17 are opposed to each other via the insulating separator 21, thereby forming an electrode pair. The electrode collectors 19 and 20 are formed on the inner surfaces of the metal case 11 and the upper case 13, respectively, and the electrode pair 17, 18 is housed in a housing space defined by the metal case 11 and the top lid 13 in such a manner that the polarizable electrodes 17 and 18 are contacted with the electrode collectors 19 and 20, respectively. Then, after the electrolytic solution 22 is impregnated in the electrode pair 17, 18 and the separator 21, the electrode pair 17, 18, and the separator 21 are housed in the housing space defined by the upper case 13 as an anode (terminal), and the metal case 11 as a cathode (terminal).

Then, the electric insulating ring packing 15 is provided in the metal case 11 at a position between a bent portion 14 formed on an outer periphery of the top lid 13, and an outer periphery of the metal case 11. By curling the outer periphery 12 of the metal case 11 inwardly, the bent portion 14 of the top lid 13 is encased by the ring packing 15, and the housing space for housing the electrode pair 17, 18 is brought into an airtight sealed state. Then, the coin-shaped electric double layer capacitor 1 (sic) is produced by integrally caulking the metal case 11 and the top lid 13 via the ring packing 15.

In the embodiment, it is preferable to form recesses or projections, namely, asperities on an area of the inner bottom surface of the metal case 11 where the metal case 11 opposes the ring packing 15. Preferably, the asperities are formed by satin finish, or by forming a plurality of concentric circular rings, with the center of the circular rings being in agreement with the center of the inner bottom surface of the metal case 11.

The satin finish is a chemical or a physical processing. Primarily, by a blast processing such as sand blast or shot blast, or a press work of pressing a mold with a predetermined asperity pattern against an object to be processed, multitudes of asperities are formed on a surface of the object. Applying the satin finish enables to enhance the firm contact of the inner bottom surface of the metal case 11 with the ring packing 15 in integrally forming the top lid 13 and the metal case 11 while pressing the outer periphery 12 of the metal case 11 and the bent portion 14 of the top lid 13 from outside. Also, applying the satin finish on the entirety of the inner bottom surface of the metal case 11 enables to improve the adhesion with the electrode collectors 19 and 20, in addition to the enhanced firm contact with the ring packing 15, whereby the internal resistance of the capacitor 1 (sic) can be reduced.

It is preferable to set the surface roughness (Ra) of the surface of the object where the asperities are formed by the satin finish in the range of 1.0 to 4.0 μm, more preferably in the range of 1.5 to 3.0 μm, and furthermore preferably in the range of 1.5 to 2.5 μm. With the satin finish, the surface of the object to be processed by the satin finish has an appropriate surface roughness when the ring packing 15 is deformed in accordance with the asperities. With this arrangement, since the ring packing 15 is efficiently deformed in accordance with the asperities, the firm contact of the ring packing 15 with the metal case 11 is enhanced, and airtightness is improved.

In the case where concentric circular rings are formed on the inner bottom surface of the metal case 11, with the center of the circular rings and the center of the inner bottom surface of the metal case 11 being in agreement with each other, the firm contact of the ring packing with the metal case is enhanced particularly in outward directions from the center of the inner bottom surface of the metal case 11, in other words, in radial directions on the inner bottom surface of the metal case 11. As shown in FIG. 2, assuming that the center of the inner bottom surface of the metal case 11 is the point marked by "C", the center of the concentric circular rings is in agreement with the center "C". The concentric circular rings are formed on the area of the inner bottom surface of the metal case 11 where the metal case 11 opposes the bottom surface of the ring packing 15 by forming such asperities that concentric circles are formed with the center "C", and with the radius "r" being different among the circles. The concentric circular rings are formed by a press work of pressing a mold having a predetermined pattern of circular rings against the inner bottom surface of the metal case 11.

Alternatively, the sealing auxiliary member 16 having compatibility with a metal may be disposed at a contact site where the metal case 11 and the ring packing 15 are contacted with each other in order to enhance sealing of the capacitor 1a. For instance, with use of the sealing auxiliary member 16 made of a material having a higher flexibility than the material of the ring packing 15, the sealing auxiliary member 16 can effectively deformed in accordance with the asperities on the inner bottom surface of the metal case 11. This enables to enhance the firm contact of the ring packing 15 with the metal case 11, and provide improved airtightness. In the case where the sealing auxiliary member 16 is provided, the surface roughness (Ra) of the area on the inner bottom surface of the metal case 11 where the asperities are formed by the satin finish is preferably in the range of 1.0 to 4.0 μm, more preferably in the range of 1.5 to 3.0 μm, and furthermore preferably in the range of 1.5 to 2.5 μm.

As mentioned above, processing the inner bottom surface of the metal case 11 by e.g. satin finish, and firmly contacting the ring packing 15 with the inner bottom surface of the metal case 11 by pressing the ring packing 15 by the top lid 13 enables to enhance the firm contact of the ring packing 15 with the metal case 11. Thereby, the airtightness of a casing constituted of the top lid 13 and the metal case 11 is enhanced, which enables to suppress intrusion of water components into the capacitor 1a, and leakage of the electrolytic solution 22 out of the capacitor 1a. Thus, the coin-shaped storage cell 1 embodying the invention has a high heat resistance, enables to prevent leakage of a liquid such as an electrolytic solution, and shows long-term stable characteristics.

In the following, examples of the coin-shaped electric double layer capacitor 1a are described, as well as their characteristics.

EXAMPLE 1

A pair of polarizable electrodes 17 and 18 were produced by: admixing activated carbon powders based on petroleum cokes with an average particle diameter of 5 μm, carbon black of average particle diameter of 0.05 μm as a conductive agent, and an aqueous binder solution (concentration: 50%) in which carboxymethylcellulose was dissolved, with a weight ratio of 10:2:1 in a kneader to yield a kneaded material; pelletizing the kneaded material into pellets; and placing the pellets in the air of 100° C. to dry the pellets for 1 hour.

Then, the polarizable electrode pair 17, 18 was produced by interposing a separator 21 made of an aramid resin between the two pellets, and impregnating an electrolytic solution 22 in the polarizable electrode pair 17, 18. The composition of the electrolytic solution 22 is shown in Table 1.

TABLE 1

| Composition of Electrolytic Solution | Wt. % |
| --- | --- |
| propylenecarbonate | 75 |
| EMIBF$_4$ | 20 |
| tetraethylammonium tetrafluoroborate | 5 |

Next, the inner bottom surface of a metal case 11 made of a stainless steel (SUS) was satin-finished by pressing a mold having an asperity pattern with a surface roughness Ra=2.0 μm against the inner bottom surface of the metal case 11. As a result of transferring the asperity pattern, the surface roughness on the area of the inner bottom surface of the metal case 11 where asperities were formed was substantially the same (Ra=about 2.0 μm) as that of the asperity pattern of the mold.

Subsequently, after carbon paste as electrode collectors 19 and 20 was coated on the inner bottom surfaces of the metal case 11 and the top lid 13, the polarizable electrodes 17 and 18 were placed on the electrode collectors 19 and 20, respectively. Then, a coin-shaped electric double layer capacitor 1a was produced by: disposing a ring packing 15 made of polyphenylene sulfide (PPS) in the metal case 11; placing a top lid 13 made of a stainless steel (SUS) over the metal case 11; and curling an outer periphery of the metal case 11 inwardly for firm contact of the ring packing 15 with the inner bottom surface of the metal case 11, while sealing the opening of the metal case 11. The capacitor 1a has 6.8 mm in diameter and 1.4 mm in height.

EXAMPLE 2

A coin-shaped electric double layer capacitor 1a in Example 2 was produced in the similar manner as the capacitor 1a in Example 1 except that the composition of the electrolytic solution in Example 2 is as shown in Table 2.

TABLE 2

| Composition of Electrolytic Solution | Wt. % |
| --- | --- |
| sulfolane | 75 |
| EDMIBF$_4$ | 18 |
| EMIBF$_4$ | 7 |

EXAMPLE 3

A coin-shaped electric double layer capacitor 1a in Example 3 was produced in the similar manner as the capacitor 1a in Example 1 except that a sealing auxiliary member 16 made of a butyl rubber with a thickness of 30 μm was interposed between a metal case 11 and a ring packing 15.

EXAMPLE 4

Figure 3:
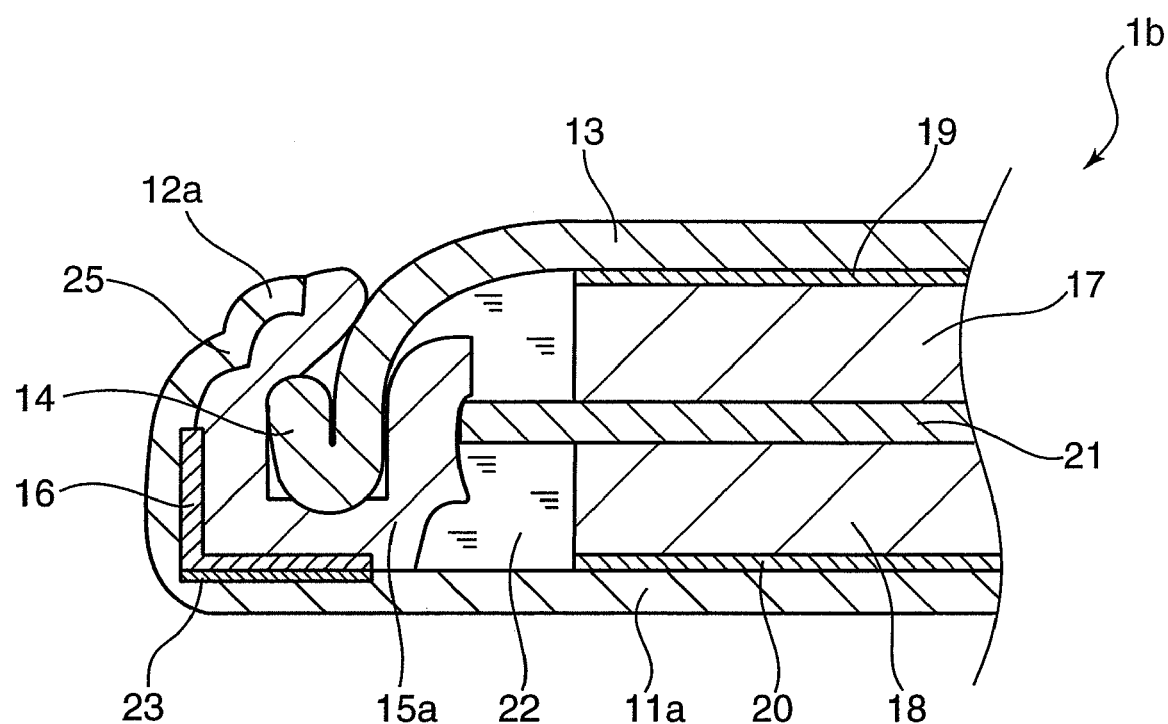
FIG. 3 is a partially cross-sectional view showing a construction of a coin-shaped electric double layer capacitor in Example 4 of the invention.

A coin-shaped electric double layer capacitor 1b in Example 4 was produced in the similar manner as the capacitor 1a in Example 1 except that, as shown in FIG. 3, an annular bulging portion 25 was formed on an outer periphery 12a of a metal case 11 (sic) to intensively press a top lid 13 and a ring packing 15a. The annular bulging portion (also called as second annular bulging portion or projection) 25 protrudes toward the ring packing 15 (sic), and is formed along the circumference of the outer periphery 12a of the metal case. The cross-section of the annular bulging portion 25 before caulking the outer periphery 12a of the metal case may be of any shape such as a triangular shape, a rectangular shape (including a polygonal shape having more than four sides), a trapezoidal shape, or a semi-circular shape, as long as the bottom surface of the annular bulging portion 25 matches the inner surface of the metal case 11 (sic).

In Example 4, the annular bulging portion 25 was formed by pressing an outer side of the outer periphery 12a of the metal case toward the ring packing 15a by press work. Alternatively, the annular bulging portion 25 may be formed by integrally forming a protrusion with the metal case 11 (sic).

Figure 10:
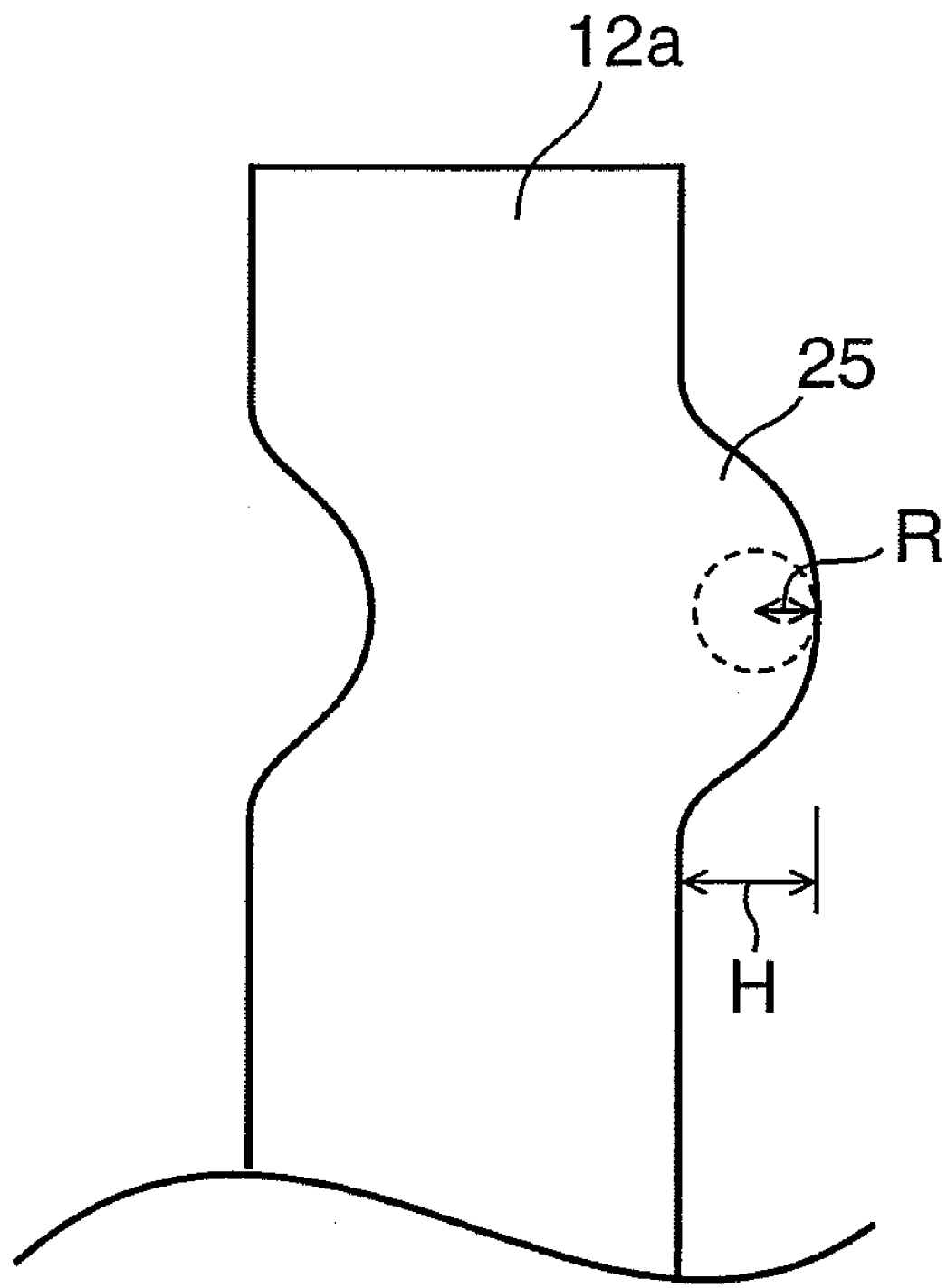
FIG. 10 is a diagram enlargedly showing an annular bulging portion before an outer periphery of a metal case is caulked.

FIG. 10 is an enlarged view showing the annular bulging portion 25 before the outer periphery 12a of the metal case is caulked. As shown in FIG. 10, the height of the protrusion of the annular bulging portion 25 is indicated by "H", which is a value measured from the inner surface of the metal case 11 (sic) in contact with the ring packing 15a. As shown in FIG. 10, the curvature radius (R) of the protrusion of the annular bulging portion 25 is defined by a radius of an imaginary circle indicated by the dotted circle, which is analogous to the protrusion of the annular bulging portion 25.

Preferably, the height "H" of the annular bulging portion 25 is in the range of 0.05 to 1.0 mm, more preferably in the range of 0.05 to 0.5 mm, and furthermore preferably in the range of 0.05 to 0.2 mm. In Example 4, the height "H" of the annular bulging portion 25 is about 0.1 mm from the inner surface of the metal case 11 (sic).

Preferably, the curvature radius "R" of the annular bulging portion 25 is in the range of 0.05 to 1.0 mm, more preferably in the range of 0.05 to 0.5 mm, and furthermore preferably in the range of 0.05 to 0.2 mm. In Example 4, the curvature radius "R" of the annular bulging portion 25 is about 0.1 mm. With this arrangement, sealing of the capacitor 1b by the metal case 11a, the ring packing 15a, and the top lid 13 can be effectively performed.

Also, the annular bulging portion 25 may preferably be formed at an upper position relative to an end portion of a bent portion 14 of the top lid 13 for the following reason. In integrally caulking the top lid 13, the ring packing 15a, and the metal case 11a, the annular bulging portion 25 effectively presses the ring packing 15a, with the end portion of the bent portion 14 being encased via the ring packing 15a. This provides enhanced sealing of the capacitor 1b by the metal case 11a, the ring packing 15a, and the top lid 13.

EXAMPLE 5

A coin-shaped electric double layer capacitor 1a in Example 5 was produced in the similar manner as the capacitor 1a in Example 1 except that asperities were formed on the inner bottom surface of a metal case 11, in place of the satin finish, by press work in which the asperities were concentric circular rings, and the center of the circular rings was in agreement with the center of the inner bottom surface of the metal case 11. With the asperities in the form of the circular rings, the length of a channel for flowing an electrolytic solution 22 is extended, and the electrolytic solution 22 is efficiently reserved in the recesses of the asperities in the form of the concentric circular rings, which hinders the electrolytic solution 22 from flowing out of the cell. With the asperities in the form of the circular rings, the firm contact of the metal case with a ring packing is enhanced particularly in outward directions from the center of the inner bottom surface of the metal case 11, in other words, in radial directions on the inner bottom surface of the metal case 11.

COMPARATIVE EXAMPLE 1

A coin-shaped electric double layer capacitor 1a in Comparative Example 1 was produced in the similar manner as the capacitor 1a in Example 1 except that the inner bottom surface of a metal case 11 was not processed.

After the external terminals 101 and 102 were attached to the top lid 13 and the metal case 11 of each of the coin-shaped electric double layer capacitors 1a and 1b in Examples 1 to 5, and in Comparative Example 1, the external terminals 101 and 102 were attached to printed boards by reflow soldering. Thereafter, a high-temperature and high-humidity load test was conducted, and a change in internal resistance, and a liquid-leakage resistance of each of the capacitors were checked.

Figure 4:
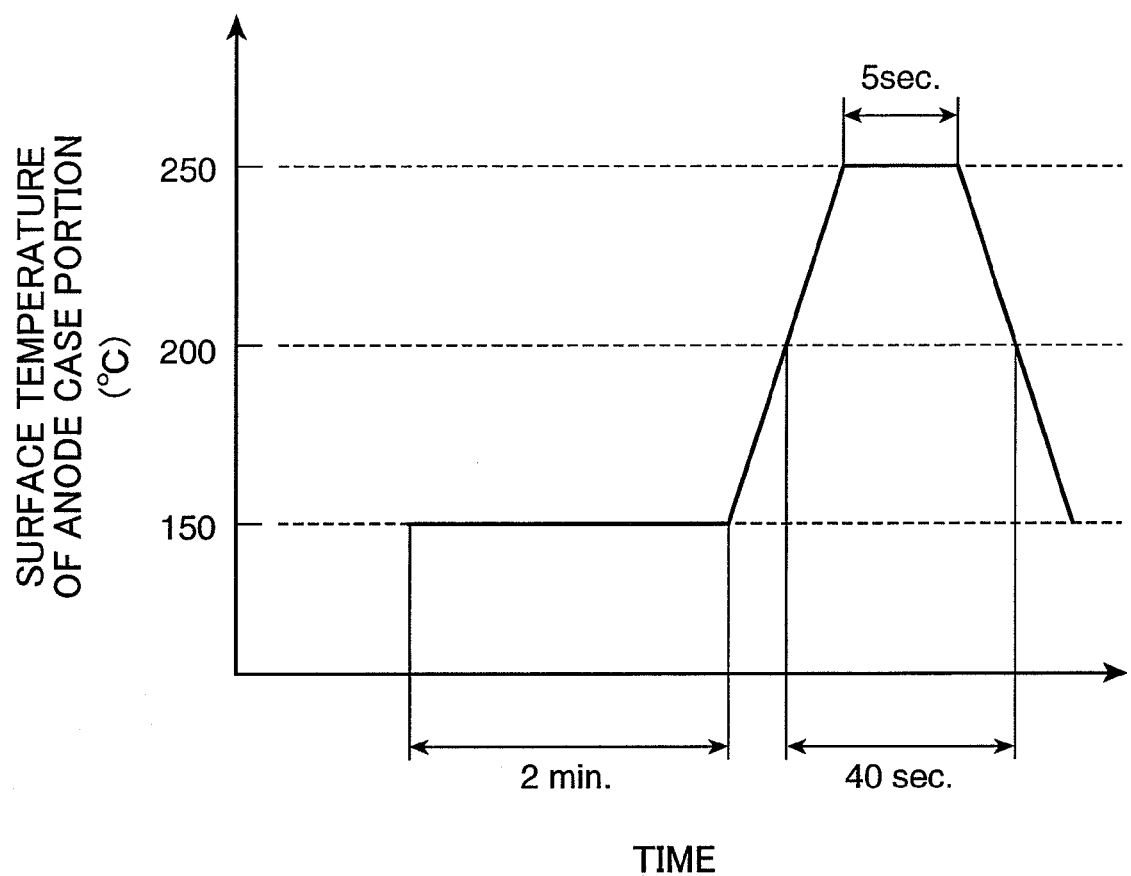
FIG. 4 is a diagram of a temperature profile in reflow soldering.

FIG. 4 is a diagram showing a temperature profile in reflow soldering. As shown in FIG. 4, the reflow soldering was carried out by conducting pre-heating at 150° C. for 2 minutes and conducting primary heating at 200° C. or higher for 40 seconds. In the reflow soldering, the highest temperature was 250° C., and the highest-temperature condition was retained for 5 seconds. The aforementioned temperature indicates the surface temperature of the anode case portion i.e. the top lid 13 of the capacitor 1a, 1b.

Figure 5:
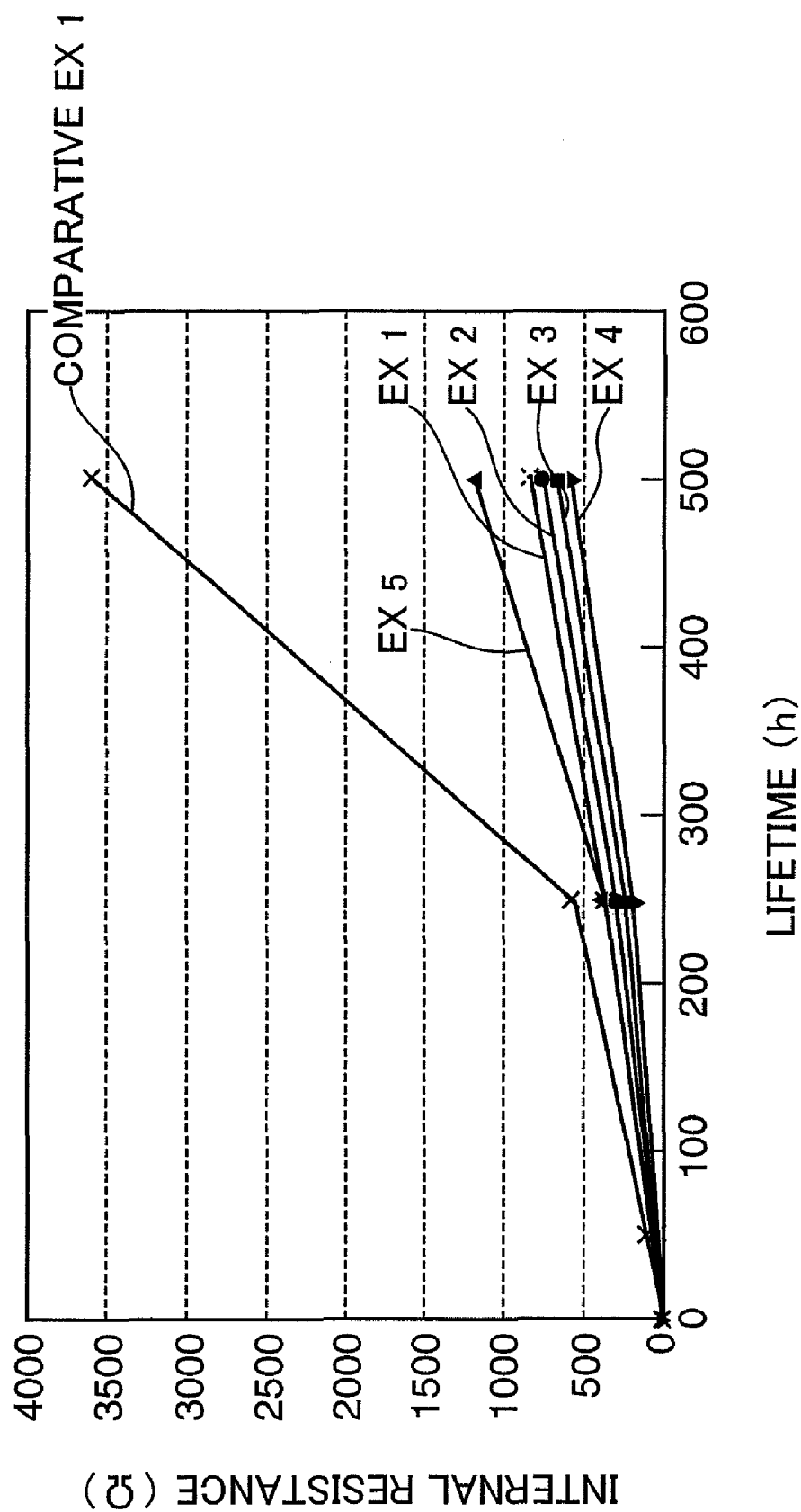
FIG. 5 is a graph showing a relation between lifetime and internal resistance of coin-shaped electric double layer capacitors.

FIG. 5 is an illustration showing a relation between life time (unit: hour), and internal resistance (unit: Ω) of the coin-shaped electric double layer capacitor 1a, 1b in the case where a rated voltage of 3.3 V was applied for 500 hours under a high-temperature high-humidity condition (temperature: 55° C., humidity: 95%). The internal resistance shows a behavior that the internal resistance is very small immediately after the production of the capacitors, but is increased, for instance, by defective sealing of the metal case 11 and the top lid 13, or due to intrusion of water components, which may degrade the electrolytic solution 22 inside the capacitors. Also, the internal resistance is increased by a time-based change in position of the polarizable electrodes 17 and 18 or the like, or a time-based change in contact state of the polarizable electrodes 17 and 18 with the other parts. In other words, a smaller internal resistance means that the capacitor retains its sealing condition immediately after the production thereof due to a good sealing performance of the metal case 11 with the top lid 13, whereas a larger internal resistance means that the sealing performance of the capacitor is degraded.

The results in FIG. 5 show that at the lifetime of 50 hours, the internal resistances of the capacitors in all the Examples are small, and a difference in internal resistance among the capacitors is significantly small. However, when the lifetime reaches 250 hours, whereas the internal resistance of the capacitor in Comparative Example 1, which is an example of a conventional capacitor, exceeds 500Ω, the internal resistance of each capacitor in Examples 1 to 5 is about 250Ω, i.e., about half as large as that in Comparative Example 1, which means that a change in internal resistance is relatively small. Further, when the lifetime reaches 500 hours, whereas the internal resistance of the capacitor in Comparative Example 1 is drastically increased to about 3,600Ω, the internal resistance of each capacitor in Examples 1 to 4 remains in the level of about 600 to 800Ω, and the internal resistance of the capacitor in Example 5 remains about 1,100Ω. Thus, the internal resistance of each capacitor in Examples 1 to 5 is about several tenths as large as the internal resistance of the conventional capacitor.

As is obvious from FIG. 5, the results of the high-temperature high-humidity load test show that each of the coin-shaped electric double layer capacitors in Examples 1 to 4 according to the embodiment of the invention has a small change in internal resistance, as compared with the coin-shaped electric double layer capacitor in Comparative Example 1, which is a conventional capacitor. In other words, the inventive coin-shaped electric double layer capacitor has a superior sealing performance of the metal case 11 with the top lid 13 via the ring packing 15.

Next, test results on liquid-leakage resistance after the reflow soldering and the high-temperature high-humidity load test are shown in Table 3.

TABLE 3

| | Liquid-leakage resistance after reflow soldering | Liquid-leakage resistance after high-temperature high-humidity load test | Peeling strength (g) |
|---|---|---|---|
| Ex. 1 | ○ | ○ | 164.3 |
| Ex. 2 | ○ | ○ | 164.3 |
| Ex. 3 | ⊚ | ⊚ | 178.5 |
| Ex. 4 | ⊚ | ⊚ | 184.2 |
| Ex. 5 | ⊚ | ⊚ | 135.0 |
| Comp. Ex. 1 | X | X | 64.3 |

(⊚: excellent, ○: good, X: poor)

In Table 3, the results on liquid-leakage resistance are shown by the marks (⊚, ○, and x). The mark "⊚" (excellent) indicates that the capacitor is substantially completely sealed substantially with no liquid leakage. The mark "○" (good) indicates that the sealing performance of the capacitor is good, with a negligible amount of liquid leakage being observed. The mark "x" (poor) indicates that the sealing performance of the capacitor is not good, with a non-negligible amount of liquid leakage being observed. Therefore, as is obvious from Table 3, Examples 1 to 5 according to the embodiment of the invention provide coin-shaped electric double layer capacitors which are substantially free of liquid-leakage out of the ring packing, and are provided with superior sealing performance and stable characteristics, as compared with the coin-shaped electric double layer capacitor in Comparative Example 1, as far as the liquid-leakage resistance after the reflow soldering and the high-temperature high-humidity load test are concerned.

In Example 3 where the sealing auxiliary member 16 is interposed between the metal case 11 and the ring packing 15, or in Example 4 where the annular bulging portion 25 is formed around the outer periphery 12a of the metal case, a coin-shaped electric double layer capacitor provided with a particularly superior sealing performance is obtained. Thus, the coin-shaped electric double layer capacitor in accordance with the first embodiment has a superior heat resistance after reflow soldering, liquid-leakage resistance, and lifetime characteristics.

Table 3 shows peeling strength (unit: g) in addition to the liquid-leakage resistances. The peeling strength was measured as follows. First, a butyl rubber of 0.1 mm in thickness, as a sealing auxiliary agent, was coated on a plastic plate made of polyphenylene sulfide (PPS), which was the same material as the ring packing. Then, a satin-finished stainless steel (SUS) plate was covered onto the plastic plate to dry. Subsequently, the SUS plate was peeled from the plastic plate by a push-pull gauge, and the peeling strength at the time of the peeling was measured. The measurement was conducted three times for each of the capacitors in Examples and Comparative Example. The values shown in Table 3 are averages of the three measurements. The peeling strengths in Examples 1 and 2 are substantially the same because the capacitors in Examples 1 and 2 are substantially the same except for the composition of the electrolytic solution.

The results in Table 3 shows that the satin finished SUS plates used in the capacitors in Examples 1 to 4 according to the embodiment of the invention have an adhesive strength 2.5 times or more as large as the unfinished SUS plate in Comparative Example. Also, the SUS plate used in Example 5 according to the embodiment of the invention, in which the asperities in the form of concentric circles were formed, has an adhesive strength about 2.1 times as large as the SUS plate used in Comparative Example. In other words, applying the satin finish or forming the asperities in the form of concentric circles on the metal case of the coin-shaped electric double layer capacitor increases the adhesive strength with the ring packing or the sealing auxiliary member, and enhances airtight sealing, thereby improving liquid-leakage resistance.

Second Embodiment

Figure 6:
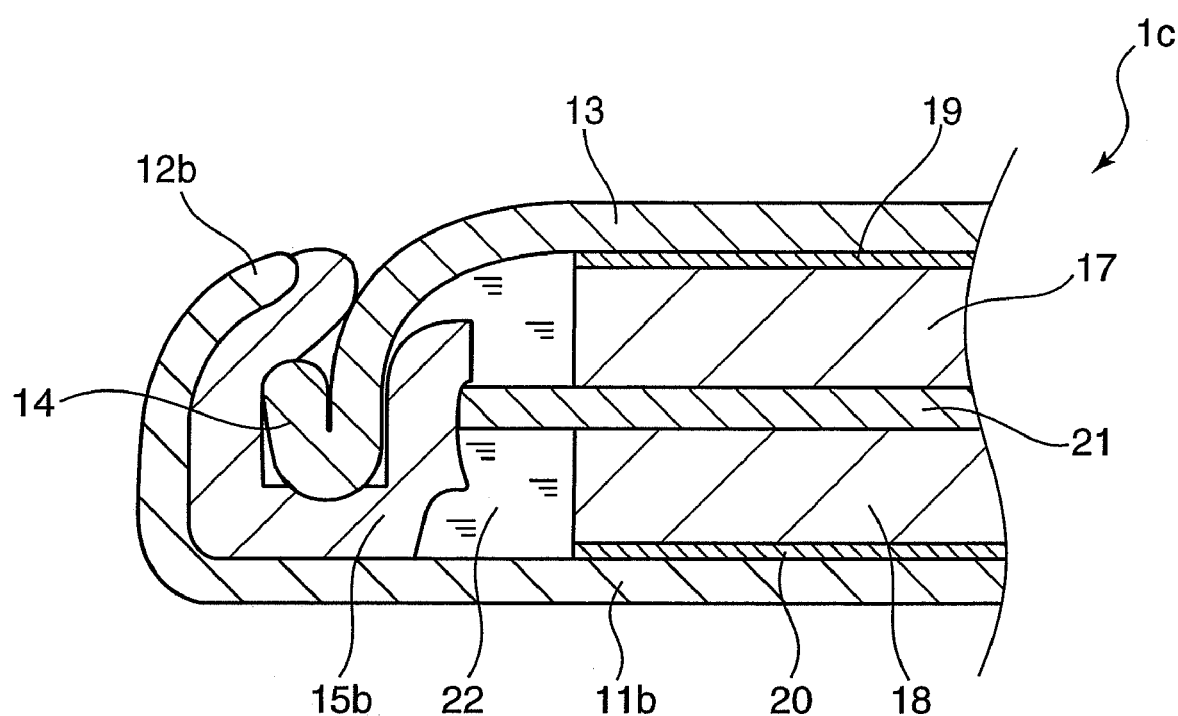
FIG. 6 is a partially cross-sectional view showing a construction of a coin-shaped electric double layer capacitor as a second embodiment of the invention.
Figure 7:
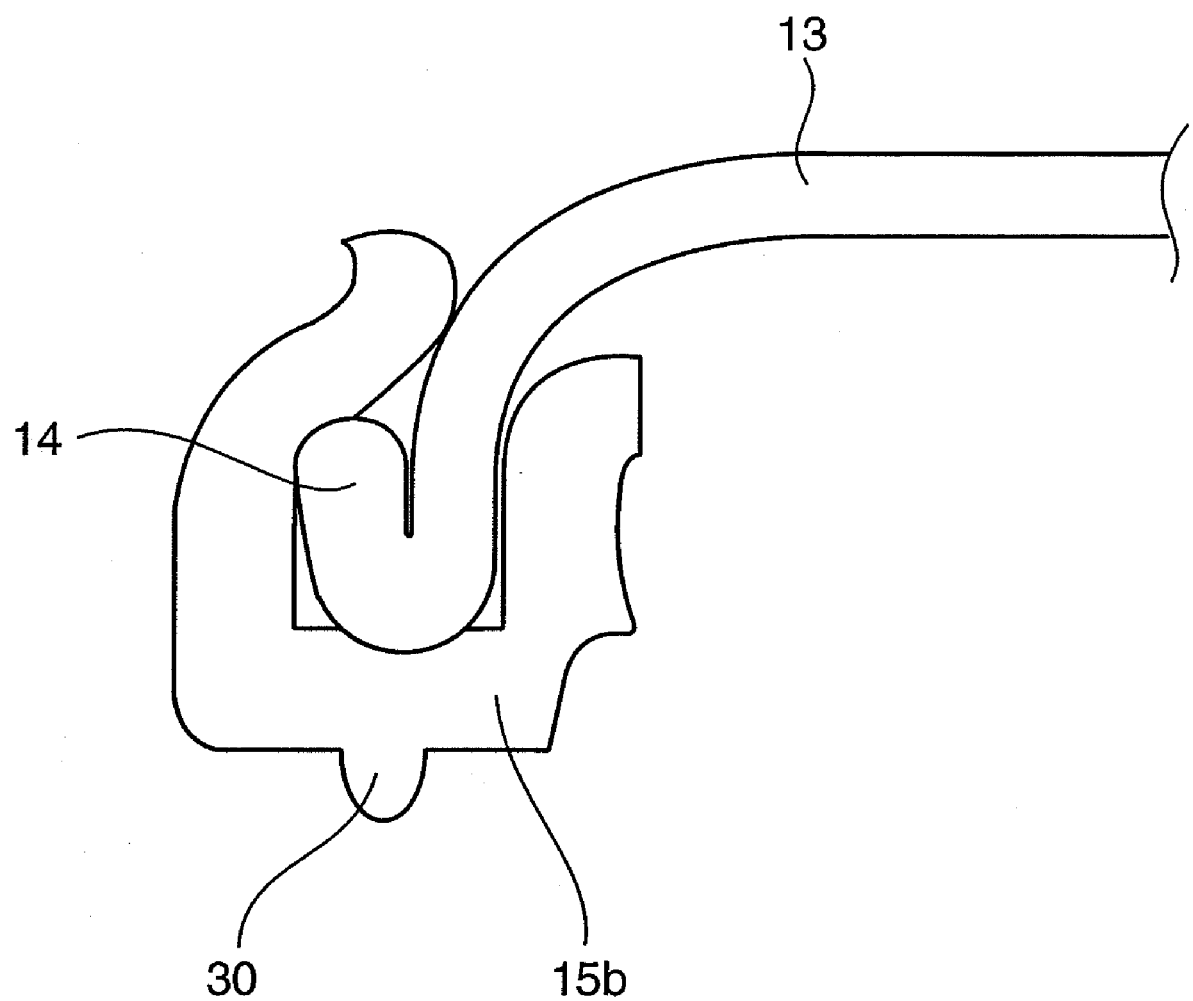
FIG. 7 is a partially enlarged view of a ring packing to be used in the second embodiment.

FIG. 6 is a partially cross-sectional view showing an arrangement of a coin-shaped electric double layer capacitor in accordance with a second embodiment of the invention. Referring to FIG. 6, the arrangement of a pair of polarizable electrodes 17 and 18 in the second embodiment is substantially the same as that of the coin-shaped electric double layer capacitor 1a in the first embodiment except that an inner bottom surface of a metal case 11b of the capacitor 1c in the second embodiment is not satin-finished. Also, a ring packing 15b in the second embodiment has a shape as depicted in FIG. 7, and is formed with an annular bulging portion (also called as first annular bulging portion or projection) 30 which protrudes toward the metal case 11b. The annular bulging portion 30 formed on the ring packing 15b is deformed and firmly contacted with the inner bottom surface of the metal case 11b when an outer periphery 12b of the metal case 11b is curled inwardly, whereby enhanced airtight sealing can be secured for the capacitor 1c.

Preferably, the annular bulging portion 30 has such a configuration that an average radius obtained by connecting midpoints between an inner radius and an outer radius of the bottom surface of the ring packing 15b is defined as a centerline of the annular bulging portion 30 for the following reason. With the thus formed annular bulging portion 30, the pressing force is efficiently exerted to the annular bulging portion 30 when the annular bulging portion 30 formed on the ring packing is pressed inwardly. As a result, the annular bulging portion 30 is uniformly deformed. This enables to enhance the firm contact of the metal case with the ring packing, and improve airtightness.

The height of the annular bulging portion 30 is preferably in the range of 0.05 to 1.0 mm from the bottom surface of the ring packing 15b, more preferably in the range of 0.05 to 0.5 mm, and furthermore preferably in the range of 0.05 to 0.2 mm. With this arrangement, the capacitor 1c is effectively sealed by the metal case 11b and the ring packing 15b when the annular bulging portion 30 formed on the ring packing 15b is pressed inwardly.

The curvature radius of the annular bulging portion 30 is preferably in the range of 0.05 to 1.0 mm, more preferably in the range of 0.05 to 0.5 mm, and furthermore preferably in the range of 0.05 to 0.2 mm. This enables to effectively seal the capacitor 1c by the metal case 11b and the ring packing 15b.

Next, the coin-shaped electric double layer capacitor 1c in the second embodiment was fabricated, using the same material as the capacitor in Example 1. The capacitor 1c has the annular bulging portion 30 of about 0.1 mm in height, and about 0.1 mm in curvature radius. After the external terminals 101 and 102 were attached to the top lid 13 and the metal case 11*b*, respectively, as shown in FIG. 1, the capacitor 1*c* was attached to a printed board by reflow soldering in accordance with the temperature profile shown in FIG. 4. Then, a liquid-leakage resistance test after the reflow soldering, and a high-temperature high-humidity load test, in which a rated voltage of 3.3 V was applied for 500 hours in a high-temperature high-humidity condition (temperature: 55° C., humidity: 95%) so as to check a liquid-leakage resistance in the high-temperature high-humidity condition were conducted. As a result of the tests, both of the liquid-leakage resistance after the reflow soldering, and the liquid-leakage resistance under the high-temperature high-humidity condition were superior (⊚).

The above observation shows that the capacitor 1*c* in accordance with the second embodiment has a superior heat resistance after reflow processing, liquid-leakage resistance, and lifetime characteristics, as well as the capacitor in accordance with the first embodiment.

Third Embodiment

Figure 8:
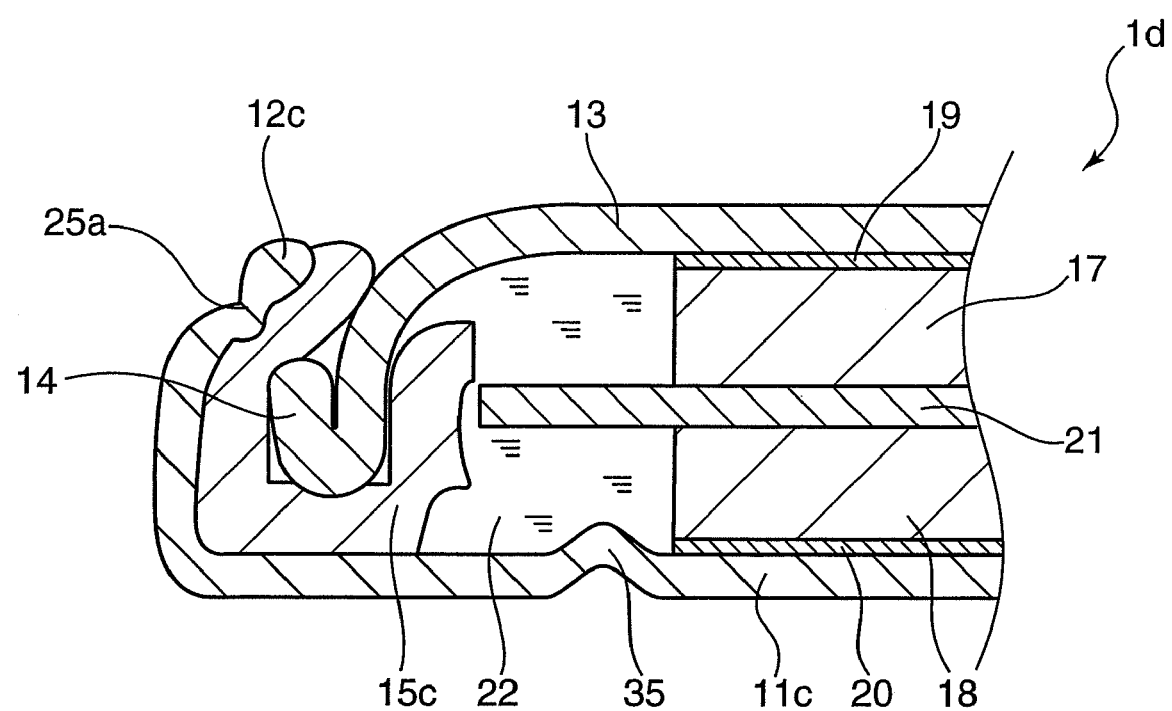
FIG. 8 is a partially cross-sectional view showing a construction of a coin-shaped electric double layer capacitor as a third embodiment of the invention.
Figure 9:
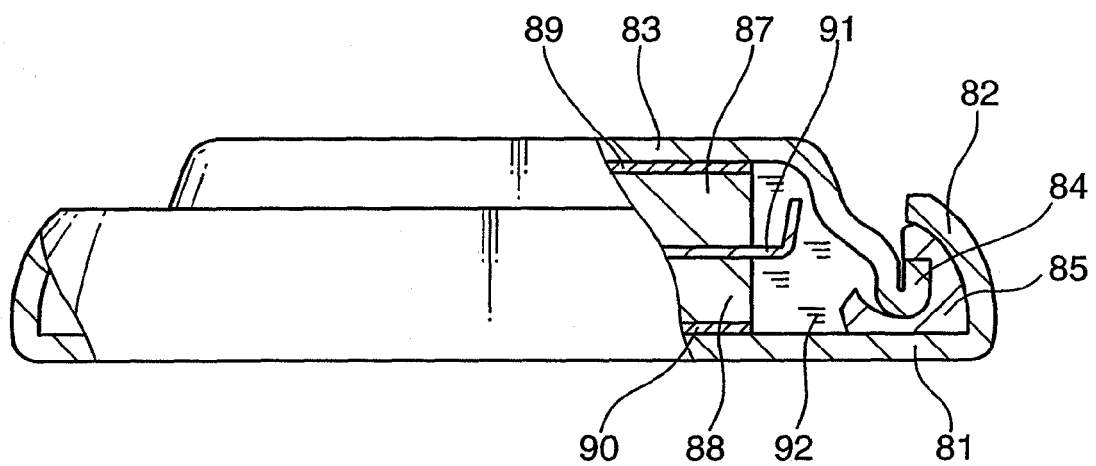
FIG. 9 is a cross-sectional view showing a construction of a conventional coin-shaped electric double layer capacitor.

FIG. 8 is a partially cross-sectional view showing an arrangement of a coin-shaped electric double layer capacitor in accordance with a third embodiment of the invention. Referring to FIG. 8, the arrangement of a pair of polarizable electrodes 17 and 18 in the third embodiment is substantially the same as that of the coin-shaped electric double layer capacitor 1*a* in the first embodiment, with use of a ring packing 15*c* equivalent to the ring packing 15*c* in the second embodiment. In the third embodiment, an inner bottom surface of a metal case 11*c* of the capacitor Id is not satin-finished. An annular bulging portion (second annular bulging portion) 25*a* for intensively pressing a top lid 13 and the ring packing 15*c* is formed around an outer periphery of the metal case 11*c*. Further, an annular bulging portion (third annular bulging portion, also called as protruding annular bulging portion) 35 is formed on the inner bottom surface of the metal case 11*c* at a radially inner position relative to the ring packing 15*c*. The annular bulging portion 35 protrudes toward the polarizable electrode pair 17, 18.

With the annular bulging portion 35, a bulging of the metal case due to an internal pressure rise of the capacitor in a high-temperature condition can be absorbed at an inner side of the annular bulging portion 35, i.e. at a central part of the coin-shaped storage cell. This suppresses distortion of the metal case, thereby suppressing degrading of the firm contact of the metal case with the ring packing.

The height of the annular bulging portion 35 is preferably in the range of 0.05 to 1.0 mm from the inner bottom surface of the metal case 11*c*, more preferably in the range of 0.05 to 0.5 mm, and furthermore preferably in the range of 0.05 to 0.2 mm. Since the height of the annular bulging portion 35 is properly set as mentioned above, the bulging of the metal case 11*c* due to the internal pressure rise of the capacitor in the high-temperature condition can be intensively absorbed at the central part of the storage cell, which enables to suppress distortion of the metal case 11*c*.

The curvature radius of the annular bulging portion 35 is preferably in the range of 0.05 to 1.0 mm, more preferably in the range of 0.05 to 0.5 mm, and furthermore preferably in the range of 0.05 to 0.2 mm.

Next, the coin-shaped electric double layer capacitor 1*c* (sic) in the third embodiment was fabricated, using the same material as the capacitor in Example 1. The annular bulging portion 25*a* of the capacitor 1d in the third embodiment is about 0.1 mm in height, and about 0.1 mm in curvature radius. The annular bulging portion 35 formed by press work is about 0.1 mm in height and about 0.1 mm in curvature radius. After the external terminals 101 and 102 were attached to the top lid 13 and the metal case 11*c*, respectively, as shown in FIG. 1, the capacitor 1d was attached to a printed board by reflow soldering in accordance with the temperature profile shown in FIG. 4. Then, a liquid-leakage resistance test after the reflow soldering, and a high-temperature high-humidity load test, in which a rated voltage of 3.3 V was applied for 500 hours in a high-temperature high-humidity condition (temperature: 55° C., humidity: 95%) so as to check a liquid-leakage resistance in the high-temperature high-humidity condition were conducted. As a result of the tests, both of the liquid-leakage resistance after the reflow soldering, and the liquid-leakage resistance under the high-temperature high-humidity condition were superior (⊚).

The above observation shows that the capacitor 1d in accordance with the third embodiment has a superior heat resistance after reflow processing, liquid-leakage resistance, and lifetime characteristics, as well as the capacitors in accordance with the first and second embodiments.

In the third embodiment, the inner bottom surface of the metal case 11*c* is not satin-finished, and the annular bulging portion 30 as shown in FIG. 7 is formed on the ring packing 15*c*. Alternatively, similarly to the first embodiment, the inner bottom surface of the metal case may be satin-finished, and the surface of the ring packing facing the metal case may be made flat. In the altered arrangement, it is preferred to dispose a sealing auxiliary member 16 at a contact site where the metal case 11 and the ring packing 15 are contacted with each other in order to enhance sealing performance of the capacitor.

Other Embodiments (A) In the foregoing embodiments, the coin-shaped electric double layer capacitors are described as some examples of the inventive coin-shaped storage cell. Alternatively, the invention is applicable to an electronic device such as a button cell, which is housed in a coin-shaped case requiring a heat resistance and airtightness. In the specification, cells having a large thickness, which is generally called as button cells, and cells having a small thickness, which is generally called coin cells, are generically called as button cells.

In the case where a button cell is produced as an example of the inventive coin-shaped storage cell, metallic lithium, lithium alloy, lithium carrier or the like is used as a material for the anode (polarizable electrode 17). Examples of the lithium alloy are alloys of lithium (Li), and bismuth (Bi), lead (Pb), aluminum (Al), or indium (In). Examples of the lithium carrier are materials obtainable by heat-treating organic polymeric compounds such as celluloses or phenol resins, carbonaceous materials such as synthetic graphite or natural graphite, lithium titanate, and metallic oxides such as tin composite oxide.

Examples of a material for the cathode (polarizable electrode 18) are inorganic compounds such as $MnO_2$ or $TiO_2$, and composite oxides of lithium, and a transition metal such as iron (Fe), cobalt (Co), or nickel (Ni).

(B) In the first embodiment, the inner bottom surface of the metal case 11 is satin-finished by press work of pressing a mold having a predetermined asperity pattern against the inner bottom surface of the metal case 11. Alternatively, the inner bottom surface of the metal case 11 may be satin-finished by a blast processing. The blast processing is advantageous in easily varying the surface roughness by controlling the particle diameter or the material of an abrasive, controlling the pressure of blasting the abrasive, or a like technique. In the case of using the blast processing, the surface roughness Ra of the area on the inner bottom surface of the metal case 11 where the asperities are formed is preferably in the range of 1.0 to 4.0 µm, more preferably in the range of 1.5 to 3.0 µm, and furthermore preferably in the range of 1.5 to 2.5 µm in order to enhance the firm contact of the metal case 11 with the ring packing 15 or the sealing auxiliary member 16.

Summary of Embodiments

The following is a brief description on the embodiments of the invention.

(1) A coin-shaped storage cell comprises: a pair of polarizable electrodes; an insulating separator which is interposed between the polarizable electrodes; an electrolytic solution which is impregnated in the polarizable electrode pair and the separator; a metal case for housing the polarizable electrode pair; an insulating ring packing which is disposed inside the metal case; and a top lid which is integrally caulked with the metal case via the ring packing, wherein the metal case includes an inner bottom surface formed with asperities.

With the above arrangement, the asperities are formed on the inner bottom surface of the metal case, and the ring packing is firmly contacted with the inner bottom surface of the metal case where the asperities are formed, with the ring packing being pressed by the top lid. The top lid, the ring packing, and the metal case are integrally caulked in this state. With this arrangement, the ring packing is deformed in accordance with the asperities, and the firm contact of the metal case with the ring packing is enhanced, as the ring packing is deformed in accordance with the asperities, and airtightness is improved. This arrangement enables to suppress intrusion of water components into the cell, and leakage of the electrolytic solution out of the cell. Accordingly, the coin-shaped storage cell according to the aspect of the invention has a high heat resistance, enables to prevent leakage of a liquid such as the electrolytic solution, and exhibits long-term stable characteristics.

(2) A coin-shaped storage cell is the coin-shaped storage cell (1), wherein the asperities are formed by satin finish.

With the above arrangement, since the asperities are formed by the satin finish, multitudes of asperities are formed at randomly on the inner bottom surface of the metal case. Accordingly, it is easy to deform the ring packing in accordance with the asperities, which enables to enhance the firm contact of the metal case with the ring packing, and improve airtightness.

(3) A coin-shaped storage cell is the coin-shaped storage cell (1), wherein the asperities are in the form of a plurality of concentric circular rings the asperities being formed by making the center of the circular rings and the center of the inner bottom surface of the metal case in agreement with each other.

With the above arrangement, since the concentric circular rings are formed on the inner bottom surface of the metal case, the length of the channel for flowing the electrolytic solution is extended due to the asperities in the form of the circular rings, which enables to suppress leakage of the electrolytic solution out of the cell. Also, the firm contact of the ring packing with the metal case is enhanced particularly in outward directions from the center of the inner bottom surface of the metal case in other words, in radial directions on the inner bottom surface of the metal case.

(4) A coin-shaped storage is any one of the coin-shaped storage cells (1) to (3), wherein the asperities are formed only on an area of the inner bottom surface of the metal case where the metal case opposes the ring packing.

With the above arrangement, since the area of the bottom surface of the ring packing and the area of the inner bottom surface of the metal case where the asperities are formed are substantially identical to each other, the firm contact of the metal case with the ring packing can be effectively secured.

(5) A coin-shaped storage is the coin-shaped storage cell (1) or (2) wherein the asperities are formed over an entire area on the inner bottom surface of the metal case.

With the above arrangement, since not only the firm contact of the metal case with the ring packing is enhanced, but also the firm contact of the electrode with the metal case, and the firm contact of the electrode with the top lid are improved, the inner resistance of the coin-shaped storage cell can be reduced greatly. Also, since the surface area of the metal case in contact with the electrolytic solution is increased, the length of the channel for flowing the electrolytic solution can be extended, which enables to suppress leakage of the electrolytic solution out of the cell.

(6) A coin-shaped storage cell is any one of the coin-shaped storage cells (1) to (5), which further comprises a sealing auxiliary member which is interposed between the metal case and the ring packing.

With the above arrangement, the metal case is firmly contacted with the ring packing via the sealing auxiliary member, in place of the arrangement that the metal case is directly firmly contacted with the ring packing. In this arrangement, selecting a material for the sealing auxiliary member having a larger flexibility than the material for the ring packing enables to effectively deform the sealing auxiliary member in accordance with the asperities on the inner bottom surface of the metal case. This enables to enhance the firm contact of the metal case with the ring packing, and improves airtightness.

(7) A coin-shaped storage cell is the coin-shaped storage cell (6), wherein the sealing auxiliary member is provided only at such an area as to substantially cover the asperities on the inner bottom surface of the metal case.

With the above arrangement, since there is no likelihood that the sealing auxiliary member contacts the electrolytic solution, degradation of the electrolytic solution can be prevented, while retaining the firm contact of the metal case with the ring packing.

(8) A coin-shaped storage cell comprises: a pair of polarizable electrodes; an insulating separator which is interposed between the polarizable electrodes; an electrolytic solution which is impregnated in the polarizable electrode pair and the separator; a metal case for housing the polarizable electrode pair; an insulating ring packing which is disposed inside the metal case; and a top lid which is integrally caulked with the metal case via the ring packing, wherein the ring packing includes a bottom surface formed with a first annular bulging portion, the first annular bulging portion protruding toward the metal case.

With the above arrangement, the first annular bulging portion is formed on the bottom surface of the ring packing, and the bottom surface of the ring packing where the first annular bulging portion is formed is firmly contacted with the inner bottom surface of the metal case, with the ring packing being pressed by the top lid. The top lid, the ring packing, and the metal case are integrally caulked in this state. In the caulking, since the first annular bulging portion formed on the ring packing is deformed, the firm contact of the metal case with the ring packing is enhanced, and airtightness is improved. This arrangement enables to suppress intrusion of water components into the cell, and leakage of the electrolytic solution out of the cell. Thus, the coin-shaped storage cell according to the another aspect of the invention has a high heat resistance, enables to prevent leakage of a liquid such as the electrolytic solution, and exhibits long-term stable characteristics.

(9) A coin-shaped storage cell is the coin-shaped storage cell (8), wherein the first annular bulging portion has such a configuration that an average radius obtained by connecting midpoints between an inner radius and an outer radius of the bottom surface of the ring packing is defined as a centerline of the first annular bulging portion.

With the above arrangement, since the pressing force is efficiently exerted to the first annular bulging portion formed on the ring packing in pressing the first annular bulging portion, the first annular bulging portion is uniformly deformed. This arrangement enables to enhance the firm contact of the metal case with the ring packing, and improve airtightness.

(10) A coin-shaped storage cell is any one of the coin-shaped storage cells (1) to (9), which further comprises a second annular bulging portion which is integrally formed with an outer periphery of the metal case, the second annular bulging portion protruding toward the ring packing.

With the above arrangement, the second annular bulging portion is formed on the outer periphery of the metal case. In integrally caulking the top lid, the ring packing, and the metal case, the second annular bulging portion effectively presses the ring packing. This enables to enhance the firm contact of the ring packing with the metal case and the top lid, and improve airtightness.

(11) A coin-shaped storage cell is the coin-shaped storage cell (10), wherein the second annular bulging portion is located above an end portion of a bent portion of the top lid.

With the above arrangement, in integrally caulking the top lid, the ring packing, and the metal case, the second annular bulging portion effectively presses the end portion of the bent portion of the top lid via the ring packing, with the end portion of the bent portion of the top lid being encased. This enables to effectively seal the cell by the metal case, the ring packing, and the top lid.

(12) A coin-shaped storage cell is any one of the coin-shaped storage cells (1) to (11), which further comprises a third annular bulging portion which is formed on the inner bottom surface of the metal case at a radially inner position relative to the ring packing, the third annular bulging portion protruding toward the polarizable electrode pair.

With the above arrangement, a bulging of the metal case due to an internal pressure rise of the cell in a high-temperature condition can be intensively absorbed at an inner side of the third annular bulging portion, i.e. at a central part of the storage cell. This suppresses distortion of the metal case, thereby suppressing weakening of the firm contact of the metal case with the ring packing.

(13) A coin-shaped storage cell is any one of the coin-shaped storage cells (1) to (12), wherein the top lid and the metal case have respective outer surfaces thereof to be connectable with external terminals each in the shape of a substantially triangular shape.

With the above arrangement, the substantially triangular shaped outer surfaces of the external terminals are mounted on the top lid and the metal case, respectively. This enables to stably fix the coin-shaped storage cell, and to reduce contact resistances with the external terminals.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

Exploitation in Industry

The coin-shaped storage cell of the invention has a superior sealing performance against rise of an internal pressure of the storage cell at the time of high-temperature reflow processing, and accordingly is useful as a main power source and a memory backup source of electronic devices which require surface mounting by lead-free reflow soldering.

The invention claimed is:

1. A coin-shaped storage cell comprising:
a pair of polarizable electrodes;
an insulating separator which is interposed between the polarizable electrodes;
an electrolytic solution which is impregnated in the polarizable electrode pair and the separator;
a metal case for housing the polarizable electrode pair;
an insulating ring packing which is disposed inside the metal case;
a top lid which is integrally caulked with the metal case via the ring packing; and
an annular bulging portion which is formed on the inner bottom surface of the metal case at a radially inner position relative to the ring packing, the annular bulging portion protruding toward the polarizable electrode pair,
wherein the metal case includes an inner bottom surface formed with asperities.

2. A coin-shaped storage cell comprising:
a pair of polarizable electrodes;
an insulating separator which is interposed between the polarizable electrodes;
an electrolytic solution which is impregnated in the polarizable electrode pair and the separator;
a metal case for housing the polarizable electrode pair;
an insulating ring packing which is disposed inside the metal case; and
a top lid which is integrally caulked with the metal case via the ring packing, wherein
the ring packing includes a bottom surface formed with a first annular bulging portion, the first annular bulging portion protruding toward the metal case.

3. The coin-shaped storage cell according to claim 2, wherein
the first annular bulging portion has such a configuration that an average radius obtained by connecting midpoints between an inner radius and an outer radius of the bottom surface of the ring packing is defined as a centerline of the first annular bulging portion.

4. The coin-shaped storage cell according to claim 2, further comprising a second annular bulging portion which is integrally formed with an outer periphery of the metal case, the second annular bulging portion protruding toward the ring packing.

5. The coin-shaped storage cell according to claim 4, wherein
the second annular bulging portion is located above an end portion of a bent portion of the top lid.

6. The coin-shaped storage cell according to claim 2, further comprising a third annular bulging portion which is formed on the inner bottom surface of the metal case at a radially inner position relative to the ring packing, the third annular bulging portion protruding toward the polarizable electrode pair.

7. The coin-shaped storage cell according to claim 2, wherein
the top lid and the metal case have respective outer surfaces thereof to be connectable with external terminals each in the shape of a substantially triangular shape.

* * * * *